United States Patent
Zhu et al.

(10) Patent No.: US 11,781,968 B2
(45) Date of Patent: Oct. 10, 2023

(54) DEVICE FOR CIGARETTE TIPPING PAPER ANTI-ADHESION TEST AND ITS APPLICATION METHOD

(71) Applicant: CHINA TOBACCO YUNNAN INDUSTRIAL CO., LTD., Kunming (CN)

(72) Inventors: Ruizhi Zhu, Kunming (CN); Ji Yang, Kunming (CN); Zhijiang Yin, Kunming (CN); Zhihua Liu, Kunming (CN); Kai Wang, Kunming (CN); Yanqun Xu, Kunming (CN); Xiaoxi Si, Kunming (CN); Chunbo Liu, Kunming (CN); Fengmei Zhang, Kunming (CN); Wei Jiang, Kunming (CN); Zhenjie Li, Kunming (CN)

(73) Assignee: CHINA TOBACCO YUNNAN INDUSTRIAL CO., LTD., Kunming (CN)

( * ) Notice: Subject to any disclaimer, the term of this patent is extended or adjusted under 35 U.S.C. 154(b) by 0 days.

(21) Appl. No.: 18/166,125

(22) Filed: Feb. 8, 2023

(65) Prior Publication Data

US 2023/0184666 A1 Jun. 15, 2023

Related U.S. Application Data

(63) Continuation of application No. PCT/CN2021/126541, filed on Oct. 27, 2021.

(30) Foreign Application Priority Data

Oct. 19, 2021 (CN) .......................... 202111215967.8

(51) Int. Cl.
*G01N 19/04* (2006.01)
*A24C 5/34* (2006.01)

(52) U.S. Cl.
CPC ............... *G01N 19/04* (2013.01); *A24C 5/34* (2013.01)

(58) Field of Classification Search
CPC .................................. G01N 19/04; A24C 5/34
(Continued)

(56) References Cited

U.S. PATENT DOCUMENTS 2,677,479 A * 5/1954 Kiba .......................... E05D 5/10
16/257

FOREIGN PATENT DOCUMENTS

CN 207163886 U 3/2018
CN 109470632 A 3/2019
(Continued)

OTHER PUBLICATIONS

International Search Report dated Jul. 21, 2022; International Application No. PCT/CN2021/126541; International Filing Date Oct. 27, 2021; 5 pages, China National Intellectual Property Administration (ISA/CN), Beijing, China.

*Primary Examiner* — Robert R Raevis
(74) *Attorney, Agent, or Firm* — Andrew D. Fortney; Central California IP Group, P.C.

(57) ABSTRACT

A device for a cigarette tipping paper anti-adhesion test is disclosed. The device includes the following components: an upper cover (1), a plurality of upper cover semi-cylinders (11) inside the upper cover, having the same radius and arranged in parallel, and a box (2) with a plurality of holes (211) on the box upper surface (21), connected with the inner cavity of the box (2). Each upper cover semi-cylinder has a cross-section with a bow shape. The side wall of the box (2) also has an opening (22). A method for testing anti-adhesion of the cigarette tipping paper using the device (Continued)

is also disclosed. The present device can qualitatively and quantitatively simulate adhesion of tipping paper in various conditions.

13 Claims, 3 Drawing Sheets

(58) Field of Classification Search
USPC .............. 73/150 A, 864.51–864.59, 864.91; 220/200–380
See application file for complete search history.

(56) References Cited

FOREIGN PATENT DOCUMENTS

| | | |
|---|---|---|
| CN | 110320094 A | 10/2019 |
| CN | 110646333 A | 1/2020 |
| CN | 112033900 A | 12/2020 |
| CN | 112198094 A | 1/2021 |
| JP | 2003004627 A | 1/2003 |

\* cited by examiner

DEVICE FOR CIGARETTE TIPPING PAPER ANTI-ADHESION TEST AND ITS APPLICATION METHOD

CROSS-REFERENCE TO RELATED APPLICATIONS

This application is a continuation of International Pat. Appl. No. PCT/CN2021/126541, filed on Oct. 27, 2021, which claims the benefit of Chinese Pat. Appl. No. 202111215967.8, filed on Oct. 19, 2021, both of which are incorporated herein by reference as if fully set forth herein.

FIELD OF THE INVENTION

The present invention belongs to the field of tobacco, and in particular, to the technical field of a device for cigarette tipping paper anti-adhesion testing and its application method.

DISCUSSION OF THE BACKGROUND

During packaging, transportation, storage, etc., certain conditions such as high temperature, high humidity, extrusion, etc. may cause adhesion of surface coating of cigarette filter tipping paper, which may seriously affect the quality of cigarette products and the smoking experience. The reasons why there is no device that can qualitatively and quantitatively test adhesion of cigarette tipping paper in the prior art are that, on one hand, as contact between cigarette pillars in the packing box exists in line or/and surface, the contact area is small, the device in the prior art mainly qualitatively tests adhesion between the surface, as disclosed in FZ/T 01063-2008, anti-adhesion test of coated fabric is carried out on two plates pressing six samples, which is the contact between two surfaces, and it is unable to simulate adhesion of cigarette tipping paper in packing box. On the other hand, cigarettes are sometimes in certain conditions such as high temperature and high humidity. However, the device in the prior art cannot be tested in such conditions. At present, there is no such device for cigarette tipping paper anti-adhesion test, thus, the device for cigarette tipping paper anti-adhesion test in simulated conditions is developed can screen anti-adhesion of cigarette tipping paper and avoid the influence of the use of cigarette tipping paper with adhesion risk on cigarette quality.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention aims to solve the above-mentioned problems.

The present invention provides a device for cigarette tipping paper anti-adhesion test and a method for anti-adhesion test of cigarette tipping paper.

The technical solutions of the present invention are as follows:

A first aspect of the present invention discloses a device for cigarette tipping paper anti-adhesion test, which comprises the following components:

An upper cover 1, the inside of which includes a plurality of upper cover semi-cylinders 11 with the same radius and configured in parallel, and each upper cover semi-cylinder 11 has a cross-section with a first bow shape. The plurality of the upper cover semi-cylinders with the same radius can be closely configured or within a certain distance from each other.

A box 2, having a plurality of holes 211 on the box upper surface 21 connected with the inner cavity of the box 2. A side wall of the box 2 has an opening 22. The holes 211 may be tiny holes, which can allow hot air or damp and hot air into the inner cavity of the box 2.

Preferably, the box upper surface 21 has a plurality of box semi-cylinders 23 with the same radius and configured in parallel, and each box semi-cylinder 23 has a cross-section with a second bow shape.

Preferably, the box semi-cylinders 23 are arranged or aligned in the same axial direction as the upper cover semi-cylinders 11.

Preferably, the box semi-cylinders 23 have the same radius as the upper cover semi-cylinders 11, and the box semi-cylinders 23 and the upper cover semi-cylinders 11 may have the same radius as the cigarette.

Preferably, the box semi-cylinders 23 have a cylinder surface that is tangent to the cylinder surface of a corresponding one of the upper cover semi-cylinders 11, which can better simulate extrusion between cigarettes.

Preferably, the opening 22 is externally connected to a hot air device that can introduce hot air into the inner cavity of the box 2.

Alternatively, the opening 22 may be externally connected to a damp and hot air device that can introduce damp and hot air into the inner cavity of the box 2 (e.g., the hot air device may introduce damp and hot air into the box inner cavity 2).

A second aspect of the present invention discloses a method for testing anti-adhesion of cigarette tipping paper using the device. The method includes the following steps:

Spread two pieces of cigarette tipping paper 3 so that the printing surface thereof faces each other on the box upper surface 21, cover the upper cover 1, place a weight on the upper cover (or the upper surface thereof) and record the value of the weight, introduce hot air at a predetermined temperature into the box inner cavity 2 through the opening 22 and record the temperature (e.g., in the box inner cavity 2); afterwards, remove the two pieces of cigarette tipping paper 3, and test the adhesion force when separating the two pieces of cigarette tipping paper 3 to obtain anti-adhesion data of cigarette tipping paper.

Alternatively, the following steps are included in the method:

Spread two pieces of cigarette tipping paper 3 so that the printing surface thereof faces each other on the box upper surface 21, cover the upper cover 1, place a weight on the upper cover (or the upper surface thereof) and record the value of the weight, introduce damp and hot air at a predetermined temperature into the box inner cavity 2 through the opening 22 and record the temperature and relative humidity of the damp and hot air (e.g., in the box inner cavity 2); afterwards, remove the two pieces of wet or damp cigarette tipping paper 3, and test the adhesion force when separating the two pieces of wet or damp cigarette tipping paper 3 to obtain anti-adhesion data of wet or damp cigarette tipping paper; or Spread two pieces of cigarette tipping paper 3 so that the printing surface thereof faces each other on the box upper surface 21, cover the upper cover 1, place a weight on the upper cover (or the upper surface thereof) and record the value of the weight, introduce damp and hot air at a predetermined temperature into the box inner cavity 2 through the opening 22 and record the temperature and relative humidity of the damp and hot air; afterwards, stop introducing the damp and hot air, completely dry the two pieces of wet or damp cigarette tipping paper 3, and test the adhesion force when separating the two completely dry pieces of cigarette tipping paper 3 to obtain anti-adhesion data of the completely dry cigarette tipping paper.

The present invention has the following beneficial effects:
1. The present invention designs for the first time a device for testing anti-adhesion of cigarette tipping paper. The device of the present invention is simple in design and is suitable for testing anti-adhesion of cigarette tipping paper in the laboratory and in production. The device of the present invention can qualitatively and quantitatively test adhesion of tipping paper.
2. Humidity, temperature and pressure of the device for cigarette tipping paper anti-adhesion test can be adjusted on site, which can simulate adhesion of tipping paper in various conditions, e.g., high temperature and high humidity, and test data is reliable and practical.

These and other advantages of the present invention will become readily apparent from the detailed description of various embodiments below.

Figure 1:
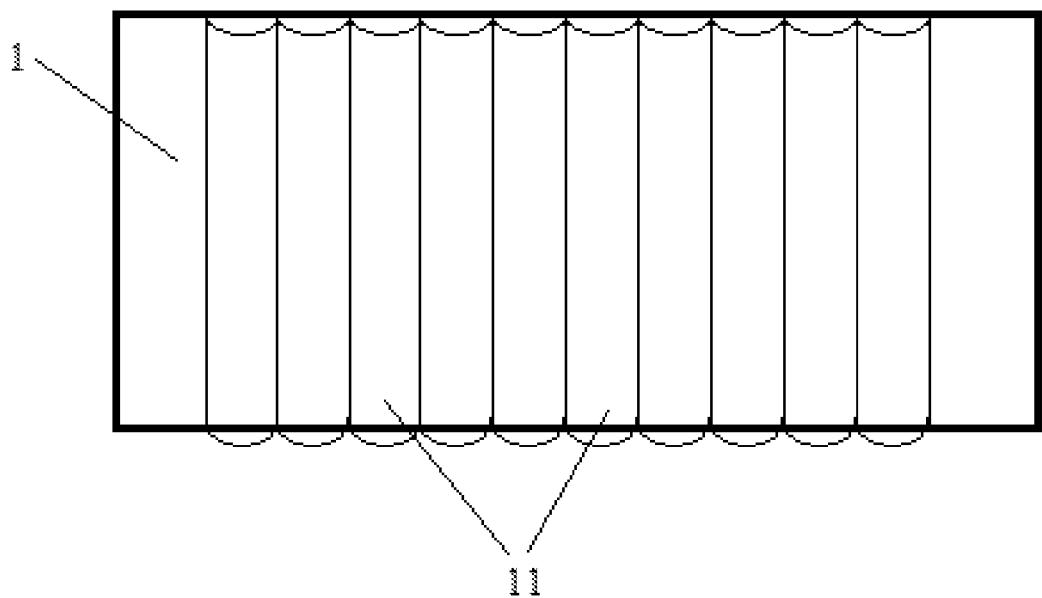
FIG. 1 is a main view of the upper cover of the device for cigarette tipping paper anti-adhesion test of the present invention.

Identification of components in the drawings is as follows: 1—Upper cover, 11—Upper cover semi-cylinder, 2—Box, 21—Box upper surface, 211—Hole, 22—Opening, 23—Box semi-cylinder, 3—Cigarette tipping paper.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

In order to make the purpose, technical solutions and beneficial effects of the present invention clearer, the following will be illustrated in detail in combination with the embodiments to facilitate the understanding of persons skilled in the art.

Figure 2:
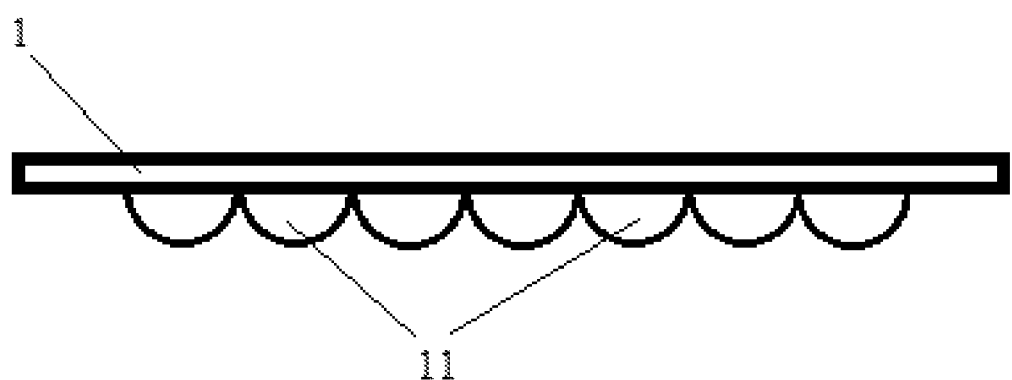
FIG. 2 is a side or edge view of the upper cover of the device for cigarette tipping paper anti-adhesion test of FIG. 1.

FIGS. 1 and 2 are the schematic view of the upper cover 1 of a device for cigarette tipping paper anti-adhesion test. The inner surface of the upper cover includes a plurality of upper cover semi-cylinders 11 with the same radius, closely configured in parallel. Each of the upper cover semi-cylinders 11 has a cross-section with a bow (e.g., semi-circular) shape.

Figure 3:
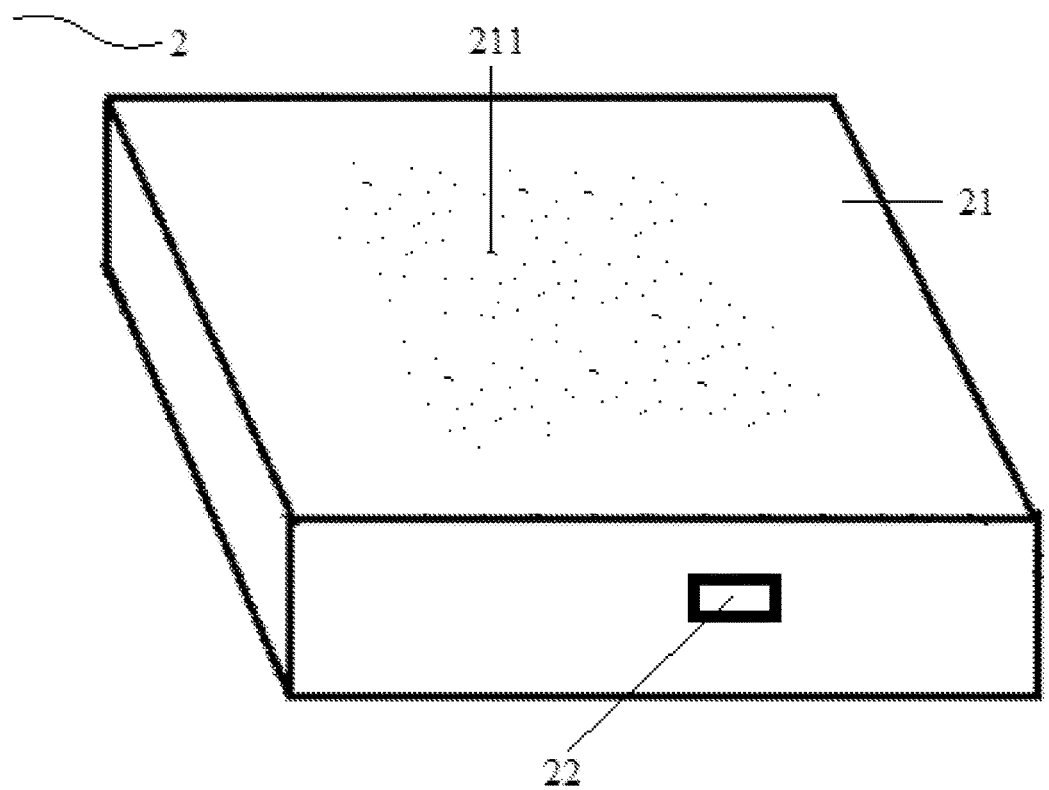
FIG. 3 is a schematic view of the box without the box semi-cylinder on the upper surface of the device for cigarette tipping paper anti-adhesion test of the present invention.

As is shown in FIG. 3, a box 2 has a plurality of holes 211 configured on the box upper surface 21, connected with the inner cavity of the box 2. The side wall of the box 2 has an opening 22. The opening 22 can be connected to an external hot air device. The opening 22 can also be connected to an external damp and hot air device. Hot air or damp and hot air can be introduced into the inner cavity of the box through the opening 22. The hot air or damp and hot air can also pass through the plurality of the holes 211 to the cigarette tipping paper to be tested. As shown in FIG. 3, the box upper surface 21 is flat.

Figure 4:
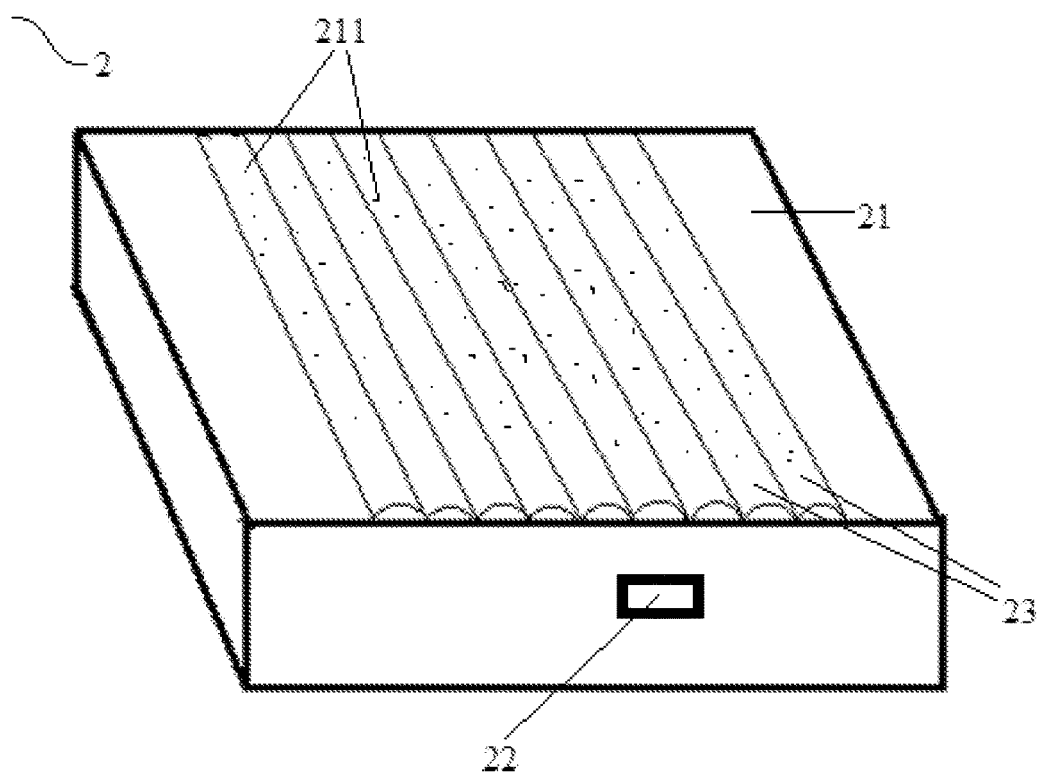
FIG. 4 is a schematic view of a plurality of the box semi-cylinder with the same radius arranged closely on the box upper surface of the device for cigarette tipping paper anti-adhesion test of the present invention.
Figure 5:
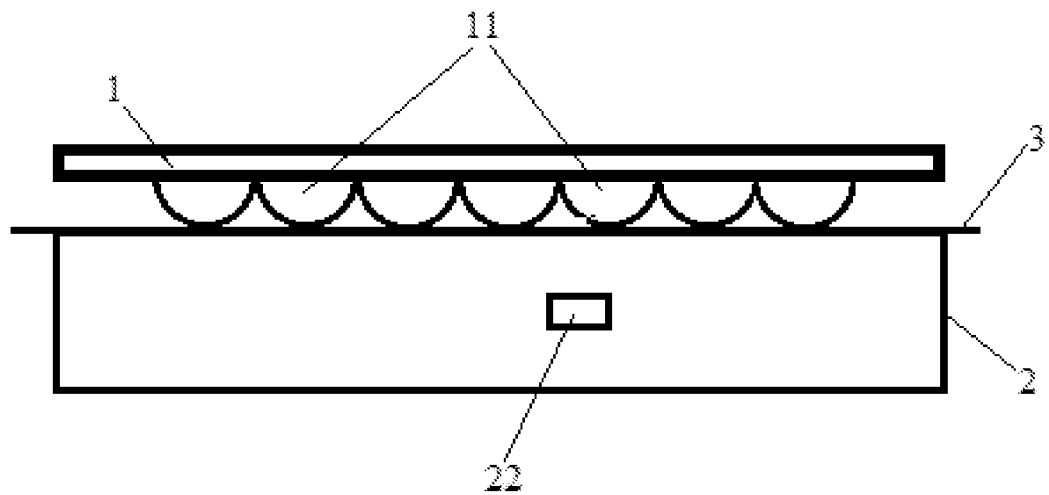
FIG. 5 is a schematic view in an anti-adhesion test state of cigarette tipping paper of embodiment 1 and embodiment 3 of the present invention.
Figure 6:
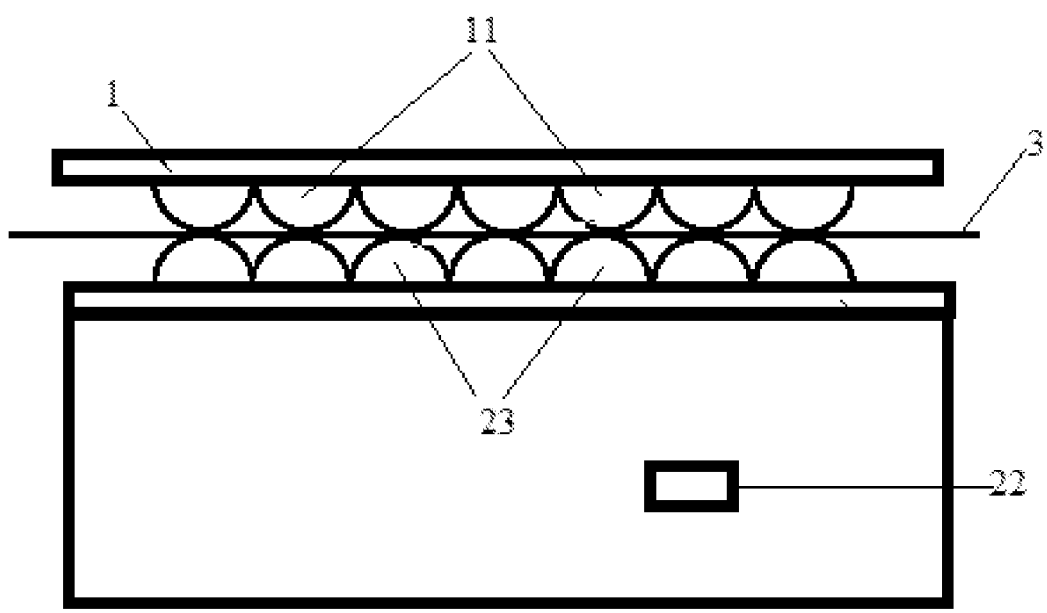
FIG. 6 is a schematic view in anti-adhesion test state of cigarette tipping paper of embodiment 2 and embodiment 4 of the present invention.

As is shown in FIG. 4, preferably, the box upper surface 21 has a plurality of box semi-cylinders 23 with the same radius, closely configured in parallel. The box semi-cylinders 23 may have the same radius as the upper cover semi-cylinder 11 and be arranged in the same axial direction. The box semi-cylinders 23 may have the same radius as the upper cover semi-cylinders 11 as well as the cigarette. Furthermore, the box semi-cylinders 23 may be configured so that the cylinder surface of each box semi-cylinder 23 is tangent to the cylinder surface of each corresponding upper cover semi-cylinder 11 in order to simulate extrusion between cigarettes.

A method for an anti-adhesion test of cigarette tipping paper using the device includes the following steps: spread two pieces of cigarette tipping paper 3 such that the printing surfaces thereof face each other on the box upper surface 21, cover the upper cover 1, then place a weight on the upper surface of the upper cover and record the value of the weight. Preferably, introduce hot air at a predetermined temperature (e.g., in the range of 35-150° C., but not limited to this range) into the box inner cavity 2 through the opening 22 and record the temperature (e.g., in the box inner cavity 2). After a certain period of time (e.g., 10-180 minutes), remove the two pieces of cigarette tipping paper 3, and test the adhesion force when separating the two pieces of cigarette tipping paper 3 to obtain anti-adhesion data of the cigarette tipping paper.

In the case that damp and hot air at the predetermined temperature (e.g., in the ranges of 50-100% relative humidity and 35-150° C., but not limited to these ranges) is introduced, the test may provide anti-adhesion data of two pieces of wet or damp (e.g., water-containing) cigarette tipping paper, as well as anti-adhesion data of two pieces of completely dry cigarette tipping paper (e.g., after dampening and drying). Damp and hot air at the predetermined temperature is introduced into the inner cavity of the box 2 through the opening 22. The damp and hot air dampens or wets the two pieces of cigarette tipping paper, and may also enter through a plurality of tiny holes 211 on the box upper surface 21. When two pieces of wet or damp cigarette tipping paper anti-adhesion data and two pieces of completely dry cigarette tipping paper anti-adhesion data are obtained, the actual conditions of cigarette products during packaging, transportation and storage can be better simulated.

The present invention will be described in further detail below in conjunction with the accompanying drawings and embodiments, but the accompanying drawings and embodiments are not intended to limit the technical solutions of the present invention, and all changes or equivalent substitutions made based on the teachings of the present invention shall belong to the present invention's protection scope.

EXAMPLES

Embodiment 1

The embodiment illustrates the device having a flat box upper surface 21 as shown in FIG. 3. The test is carried out at room temperature without introduction of hot air or damp and hot air. When the weight has a mass of 2 kg, after placing cigarette tipping paper in the box for 1 h, the adhesion force between the two pieces of cigarette tipping paper is measured as 0.000 N, and there is no adhesion on the printing surface of the tipping paper.

Embodiment 2

The embodiment illustrates the device having a box upper surface 21 as shown in FIG. 4, with a plurality of parallel box semi-cylinders 23 having the same radius. The box semi-cylinders 23 and the upper cover semi-cylinders 11 have the same radius and are configured in the same axial direction. The radius of the box semi-cylinders 23 and the radius of the upper cover semi-cylinder 11 are the same as that of the cigarette. Furthermore, the box semi-cylinders 23 are configured so that the cylinder surface of each box semi-cylinder 23 is tangent to the cylinder surface of the corresponding upper cover semi-cylinder 11. The pieces of cigarette tipping paper are tested at room temperature without introduction of hot air or damp and hot air. When the weight has a mass of 2 kg, after placing the pieces of cigarette tipping paper on the box upper surface for 1 h, the adhesion force between the two pieces of cigarette tipping paper is measured as 0.000 N, and there is no adhesion on the printing surface of the cigarette tipping paper.

Embodiment 3

Same as embodiment 1, but introduce hot air having a temperature of 120° C. into the inner cavity of box 2 through the opening 22. When the weight has a mass of 1 kg, after placing the two pieces of cigarette tipping paper on the box upper surface for 0.5 h, the adhesion force between the two pieces of cigarette tipping paper is measured as 0.654 N, and there is some adhesion on the printing surface of the cigarette tipping paper. The printing color coating on the printing surface of the cigarette tipping paper is obviously damaged during separation.

Embodiment 4

Same as embodiment 2, but introduce damp and hot air at a temperature of 50° C. and a relative humidity of 80% into the inner cavity of box 2 through the opening 22. When the weight has a mass of 1 kg, after placing two pieces of cigarette tipping paper on the box upper surface for 2 h, the adhesion force between the two pieces of cigarette tipping paper is measured as 0.206N, and there is some adhesion on the printing surface of the cigarette tipping paper. Part of the printing color coating on the printing surface of the cigarette tipping paper is slightly damaged during separation.

Embodiment 5

Same as embodiment 4, but after introducing damp and hot air at the temperature of 50° C. and relative humidity of 80% into the inner cavity of box 2 through the opening 22 for 2 h, stop introduction of the damp and hot air, and keep the cigarette tipping paper at room temperature for 24 hours until the two pieces of damp (water-containing) cigarette tipping paper are completely dry. The maximum adhesion force of the two pieces of completely dry cigarette tipping paper is measured as 2.895N. The printing surface of the cigarette tipping paper is seriously adhered, and one piece of the cigarette tipping paper is torn and broken during separation.

The above has shown and described some basic principles, main features and advantages of the present invention. It should be understood by those skilled in the art that, the present invention is not limited by the above-mentioned embodiments. What is described in the above-mentioned embodiments and the description is only to illustrate the principle(s) of the present invention. Without departing from the spirit and scope of the present invention, the present invention may have various changes and improvements, which may all fall within the scope of what is claimed. The claimed scope of the present invention is defined by the appended claims and their equivalents.

What is claimed is:

1. A system for a cigarette tipping paper anti-adhesion test, comprising:
   a cover;
   a plurality of cover semi-cylinders on a first surface of the cover, having a first same radius and configured in parallel along an axial direction of the cover semi-cylinders, wherein each cover semi-cylinder has a cross-section with a first bow shape; and a box having an upper surface, an inner cavity, a side wall and a plurality of holes in the upper surface fluidly connected with the inner cavity, wherein:

the side wall has an opening therein; and the plurality of cover semi-cylinders and the first surface of the cover face the upper surface of the box during the cigarette tipping paper anti-adhesion test.

2. The system for the cigarette tipping paper anti-adhesion test according to claim 1, further comprising a plurality of box semi-cylinders on the upper surface of the box, having a second same radius and configured in parallel along an axial direction of the box semi-cylinders, and each of the box semi-cylinders has a cross-section with a second bow shape.

3. The system for the cigarette tipping paper anti-adhesion test according to claim 2, wherein the axial direction of the box semi-cylinders is identical to the axial direction of the cover semi-cylinders.

4. The system for the cigarette tipping paper anti-adhesion test according to claim 3, wherein the second same radius is identical to the first same radius, and the first same radius and the second same radius are identical to a radius of a cigarette.

5. The system for the cigarette tipping paper anti-adhesion test according to claim 4, wherein each of the box semi-cylinders has a first cylinder surface tangent to a second cylinder surface of a corresponding one of the cover semi-cylinders.

6. The system for the cigarette tipping paper anti-adhesion test according to claim 1, further comprising a hot air device, wherein the opening is externally connected to the hot air device.

7. The system for the cigarette tipping paper anti-adhesion test according to claim 6, wherein the hot air device is configured to produce hot and damp air.

8. A method for testing anti-adhesion of cigarette tipping paper using the system according to claim 1, comprising:

placing two pieces of cigarette tipping paper on the upper surface of the box such that printing surfaces of the two pieces of cigarette tipping paper face each other, placing the cover on the two pieces of cigarette tipping paper, placing a weight on the cover and recording a value of the weight;

introducing hot air at a predetermined temperature into the box inner cavity through the opening and recording a temperature;

removing the two pieces of cigarette tipping paper, and testing an adhesion force when separating the two pieces of cigarette tipping paper to obtain anti-adhesion data of the cigarette tipping paper.

9. The method according to claim 8, wherein:

the hot air comprises damp and hot air, and the method further comprises recording a relative humidity of the damp and hot air to obtain anti-adhesion data of wet or damp cigarette tipping paper; and stopping introduction of damp and hot air, completely drying the two pieces of cigarette tipping paper, then testing the adhesion force when separating the two pieces of completely dry cigarette tipping paper to obtain anti-adhesion data of the completely dry cigarette tipping paper.

10. The system for the cigarette tipping paper anti-adhesion test according to claim 1, wherein the cover has a second surface that receives a weight when the first surface of the cover faces the upper surface of the box during the cigarette tipping paper anti-adhesion test.

11. The system for the cigarette tipping paper anti-adhesion test according to claim 10, further comprising the weight, wherein the weight has a mass of 1-2 kg.

12. The system for the cigarette tipping paper anti-adhesion test according to claim 2, wherein the second same radius is identical to the first same radius.

13. The system for the cigarette tipping paper anti-adhesion test according to claim 12, wherein the second bow shape is identical to the first bow shape.

* * * * *